(12) United States Patent
Yeung et al.

(10) Patent No.: US 7,111,167 B1
(45) Date of Patent: Sep. 19, 2006

(54) DIGITAL WATERMARKS WITH VALUES DERIVED FROM REMOTE PLATFORMS

(75) Inventors: Minerva M. Yeung, Sunnyvale, CA (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1099 days.

(21) Appl. No.: 09/608,982

(22) Filed: Jun. 30, 2000

(51) Int. Cl.
*H04L 9/00* (2006.01)
*H04K 1/00* (2006.01)
*G06F 17/30* (2006.01)
*G06F 7/04* (2006.01)
*G06K 9/00* (2006.01)
*H03M 1/68* (2006.01)

(52) U.S. Cl. ............... 713/176; 713/179; 713/181; 380/30; 705/56; 705/57; 726/32

(58) Field of Classification Search .............. 705/51, 705/55, 56, 57; 713/176, 179, 181; 380/202, 380/30; 726/32
See application file for complete search history.

(56) References Cited

U.S. PATENT DOCUMENTS

| | | | |
|---|---|---|---|
| 5,196,840 A * | 3/1993 | Leith et al. ............. 340/825.3 |
| 5,745,569 A * | 4/1998 | Moskowitz et al. .......... 705/58 |
| 5,768,426 A | 6/1998 | Rhoads |
| 5,905,800 A | 5/1999 | Moskowitz et al. |
| 5,949,885 A | 9/1999 | Leighton |
| 5,960,081 A | 9/1999 | Vynne et al. |
| 6,272,635 B1 | 8/2001 | Saito |
| 6,317,834 B1 * | 11/2001 | Gennaro et al. ............ 713/186 |
| 6,385,389 B1 * | 5/2002 | Maruyama et al. ........... 386/95 |
| 6,397,333 B1 * | 5/2002 | Sohne et al. ................ 713/176 |
| 6,668,246 B1 * | 12/2003 | Yeung et al. ................ 705/57 |
| 6,801,999 B1 * | 10/2004 | Venkatesan et al. ........ 713/167 |
| 6,823,455 B1 | 11/2004 | Macy et al. |
| 2003/0159043 A1 * | 8/2003 | Epstein ....................... 713/176 |

OTHER PUBLICATIONS

Craver et al. "Resolving Rightful Ownerships with Invisible Watermarking Techniques: Limitations, Attacks, and Implications", May 1998, IEEE Journal on Selected Areas in Communications vol. 16 No. 4, pp 573-586.*
Holliman et al. "On the Need for Image Dependent Keys for Watermarking", Mar. 1999.*
Memon et al. "Protecting Digital Media Content", Jul. 1998, Commumications of the ACM vol. 7 No. 7, pp. 35-43.*
Rivest, Ronald L. "Some Thoughts on Serial Numbers in Intel CPUs", Jan. 1999.*

* cited by examiner

*Primary Examiner*—Jacques H. Louis-Jacques
*Assistant Examiner*—Michael J. Simitoski
(74) *Attorney, Agent, or Firm*—Blakely, Sokoloff, Taylor & Zafman LLP (57) ABSTRACT

In some embodiments, the invention involves receiving remotely originating data (ROD) and creating a customized identification (CID) which is at least partially created through encrypting the ROD as a function of a platform key (PK) and a random number (RN) of a computer system receiving the ROD. Further, content is received which includes at least one watermark in which at least part of the CID is embedded. Authentication comparison data (ACD) is created which is at least partially created through decrypting data embedded in the watermark. In some embodiments, content includes first and second data sets, wherein the first data set is used to create a watermark key (WK) and the second data set is extracted utilizing the WK and the ACD includes at least part of the second data set.

22 Claims, 5 Drawing Sheets

DIGITAL WATERMARKS WITH VALUES DERIVED FROM REMOTE PLATFORMS

BACKGROUND OF THE INVENTION

1. Technical Field of the Invention

The present invention relates to digital watermarks and, more particularly, to watermarks with values derived from remote platforms. In some embodiments, the watermarks are used in connection with multiple levels of indirection.

2. Background Art

Processor serial numbers (PSNs) are numbers in a processor die to identify the processor. Operating systems, programs, and chipsets may also have similar serial numbers to identify them. The serial numbers are typically unique, but be merely one of a large number of serial numbers so it would be highly unusual for another given processor, operating system or chipset to have the same number in a given situation.

PSNs can be used for authentication. For example, a client (user) can send a PSN to a vendor, which PSN is stored at the vendors site. Then, as part of a future transaction, a vendor can compare the stored PSN with the PSN currently received from the client. If there is a match, the transaction is allowed to continue.

However, allowing remote sites to store PSNs has raised privacy concerns. A solution to the privacy concern was provided by MIT computer science professor, Ronald Rivest, who suggested a way to have electronic commerce without providing unique identifiers. Hereinafter, it will be called the Rivest Scheme. Professor Rivest suggested, first, to eliminate the serial number from the CPU (processor). There is no serial number, and so it can't be queried for, or used as an identifier for the user of the CPU. Second, we give each CPU a unique secret key Ki. These secret keys may be 128-bit AES (Advanced Encryption Standard) keys, for example. No two chips have the same key Ki. The keys might be randomly generated by the CPU manufacturer. (It is assumed that the CPU manufacturer can be trusted not to reveal the key. However, the CPU chip could generate Ki and store it in nonvolatile memory without revealing it, or the variation on the following scheme could be devised.) There is no way for a user of the CPU to determine Ki; it can't be "read out" like a serial number.

Third, we give the CPU two new instructions: a "challenge" instruction and a "decrypt and compare" instruction. The "challenge" instruction causes the CPU to do a randomized encryption of a supplied challenge, and return the resulting ciphertext. The "decrypt and compare" instruction causes the chip to determine if two such ciphertexts could have been produced on the current CPU from the same challenge.

Random numbers are generated (e.g., by the chip from thermal noise). There may be a new instruction that causes the chip to return a register (or several registers) full of random bits.

The "challenge" instruction works as follows: the chip takes in a (say) 64-bit challenge c. It then generates a (say) 64-bit random number r, using the random number generation circuitry already announced. It then returns as the result of the challenge instruction the ciphertext:

$$C(c,r) = AES(Ki, cr)$$

That is, it returns the encryption using the AES algorithm, under control of the key Ki, of the plaintext consisting of the concatenation of the challenge c with the random value r. (The first 64-bit half of the plaintext is c, the second 64-bit half of the plaintext is r.) The resulting 128-bit ciphertext $C(c,r)$ is returned by the chip in an appropriate register or set of registers. The AES algorithm (not yet chosen) takes in 128-bit plaintext values and returns 128-bit ciphertext values, under control of a 128 (or 192 or 256)-bit key.

The "decrypt and compare" instruction takes in two values C1 and C2, and decrypts them using the chip's secret key Ki, to obtain (c1,r1) and (c2,r2), where $C1=C(c1,r1)$ and $C2=C(c2,r2)$. That is, C1 was produced (or could have been produced) by the challenge instruction on input challenge c1, and C2 has produced (or could have been produced) by the challenge instruction on input challenge c2. The chip returns "true" if c1=c2, and returns "false" otherwise.

Note again that the challenge instruction is randomized—it returns (with very high probability) a different result every time it is invoked, even if it is invoked with the same challenge. Thus, it is not usable as a way of producing a unique "serial number" for the chip. For example, the result of running the challenge instruction on input challenge "0" is always changing, so that it can't be used to identify the chip.

Although the scheme proposed here involves an encryption operation, it is not possible to use the chip to "get at" the underlying AES encryption and thus perform encryption efficiently. This is important if one must live with the current set of (defective, in my mind) export control laws on encryption. Chips with this scheme on them could presumably be exported without difficulty.

Now: how does a manufacturer use these instructions to provide software that can only be run on a particular CPU? The "serial number management" or "key management" process that we had before for dongles now becomes the following three-step process. First, the user runs a challenge instruction on some challenge on his CPU. The challenge might be supplied by the manufacturer, or chosen randomly by the user. Second, the user then informs the manufacturer of the challenge c and the response $C1=C(c,r)$ that he obtained from the chip. Third, the manufacturer supplies the user with custom software that has embedded within it the ciphertext C1 and a test of the form: give the challenge c to the chip, apply the "challenge" instruction, and then use the "decrypt and compare" instruction to compare the result of the challenge instruction and C1. If the "decrypt and compare" instruction returns "true", then proceed to execute the software. Otherwise, abort.

Software produced this way will only run on the CPU that produced the original response C1. This allows one to protect against software piracy, in that a manufacturer can produce software that runs on only one CPU. (The scheme extends easily to handle the case that the user owns multiple CPUs, by embedding multiple ciphertexts in the software, and seeing if any of them compare successfully.) Note that manufacturers cannot get together off-line to compare what they know, since all they have are ciphertexts produced using unknown keys for plaintexts of which they only know half. There is no way to "link" together different results of the "challenge" instruction, without using the very same chip on which those results were produced.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

A. Introduction

The present invention involves watermarks with values derived from remote platforms. In some embodiments, the watermarks are used in connection with multiple levels of indirection.

The Rivest Scheme described in the background section is an example of a PSN alternative. Specifically, as used herein, a PSN alternative is one in which a PSN or other platform serial number is communicated in protected form to a remote location. Various other examples of the PSN alternatives are described below. Some embodiments of the invention involve using watermarks in connection with a PSN alternative.

B. Watermarks

Watermarking involves embedding unobtrusive digital marks or labels in digital content. Techniques for watermarking are known in the prior art and have been used for authentication of content in which the watermarks are included. A watermark may be a bit stream. We shall focus on robust watermarks here. The process of inserting unique robust watermarks to individual pieces of contents is referred to as content "fingerprinting." Fingerprinting of content can be done at the time of content purchase or another time. A watermarked content refers to a piece of content in which at least one watermark has been inserted. The watermark can be a fingerprint (unique identifier) of the user by the content provider, and/or any data such as control data, ownership information or meta-data that can be viewed as high-level descriptors of the content. For many situations, the content provider might be termed a content vendor and the content receiver might be termed a client.

Note that the invention is not restricted to use with any particular watermark scheme. Any robust watermarking scheme can be used to implement the techniques described herein for more secure watermark detection and communication and in subsequent hardware and/or software based authentication. The authentication may be used for various purposes including piracy control, content protection, usage control and others.

C. Eillison-Variant of PSN Alternatives

A variant of the Rivest Scheme was suggested by Intel Corporation employee Carl Ellison (hereinafter called the Ellison-variant). The Ellison-variant effectively achieves similar functionality of the Rivest Scheme (PSN alternative with privacy protection). We shall illustrate the concepts of applying PSN alternatives in watermark detection and communication using the Ellison-variant. The concepts should be readily adaptable to other variants of Rivest-like schemes.

Figure 1:
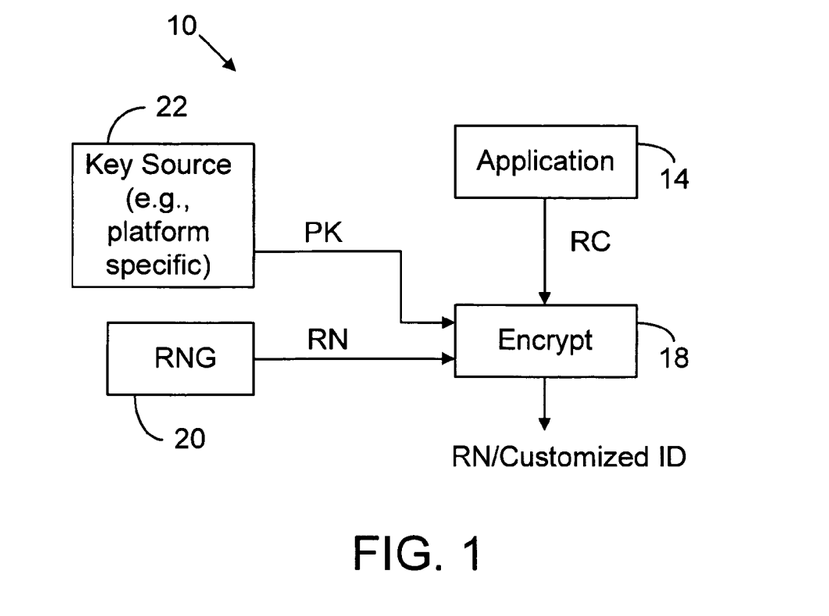
FIG. 1 is a partial flow diagram, partial block diagram illustrating a challenge and encrypt scheme according to some embodiments of the invention.

Referring to FIG. 1, a flow diagram of a content receiver computer system 10 is represented as blocks which may be software or a combination of hardware and software. Of course, computer system 10 includes other components not specifically illustrated here. An application 14 provides a random challenge (RC) received from, for example, a remote content provider. A random challenge is an example of remotely originating data (ROD).

Still referring to FIG. 1, a random number generator (RNG) 20 provides a random number (RN). RN may be truly random or merely pseudo-random. A key source 22 provides a platform key (PK). The platform key may be a processor serial number or other platform serial number (e.g., chipset or operating system serial number) or another key generated from the platform. The platform key may be derived from a processor chip, firmware hub, chipset chip, network, operating system or other hardware or software. Note that computer system 10 may be referred to as a platform, but as noted that platform key may originate from inside the platform, or originate outside the platform and be passed through the platform. The PK should be unique or at least highly unusual. The RC is encrypted (block 18) as a function of the PK and RN to produce a customized identification number (customized ID or CID). The CID may be a function of the RC, PK, and RN as well as the encryption scheme of block 18. The CID is referred to as "customized" because it is unique or practically unique to that platform and time. The RN may be concatenated with the customized ID and sent to the remote content provider. In the present disclosure, when it says Y is a function of X, it means that Y is a function of at least X, but may be also be a function of other things, such as Z.

Figure 2:
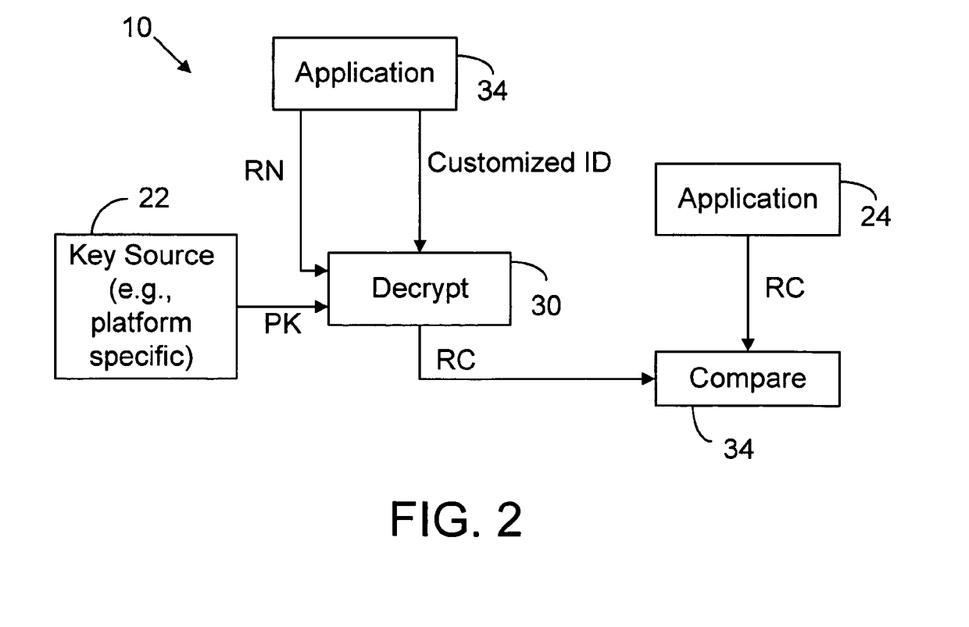
FIG. 2 is a partial flow diagram, partial block diagram illustrating a decrypt and compare scheme according to some embodiments of the invention.

Referring to FIG. 2, when the content provider (or other authenticator) wants to send content to the content receiver, it sends the RN and customized ID to computer system 10. Application 34 provides the RN and customized ID to decryption block 30. If the correct PK is provided, the original RC is produced. That RC is compared (block 34) with an RC produced from an application 24. Application 24 may include the content. There are various ways in which to make a comparison. One way is to determine whether the two RCs are equal. If so, the content is allowed to be delivered, and otherwise it is not. The RCs may be passed through functions before a comparison is made.

To protect the RC or other values, the RC or other values can reside in registers that are inaccessible to sniffing programs. Tamper resistant software may be used.

D. Embodiments of PSN Alternatives With Watermarking Schemes

Figure 3:
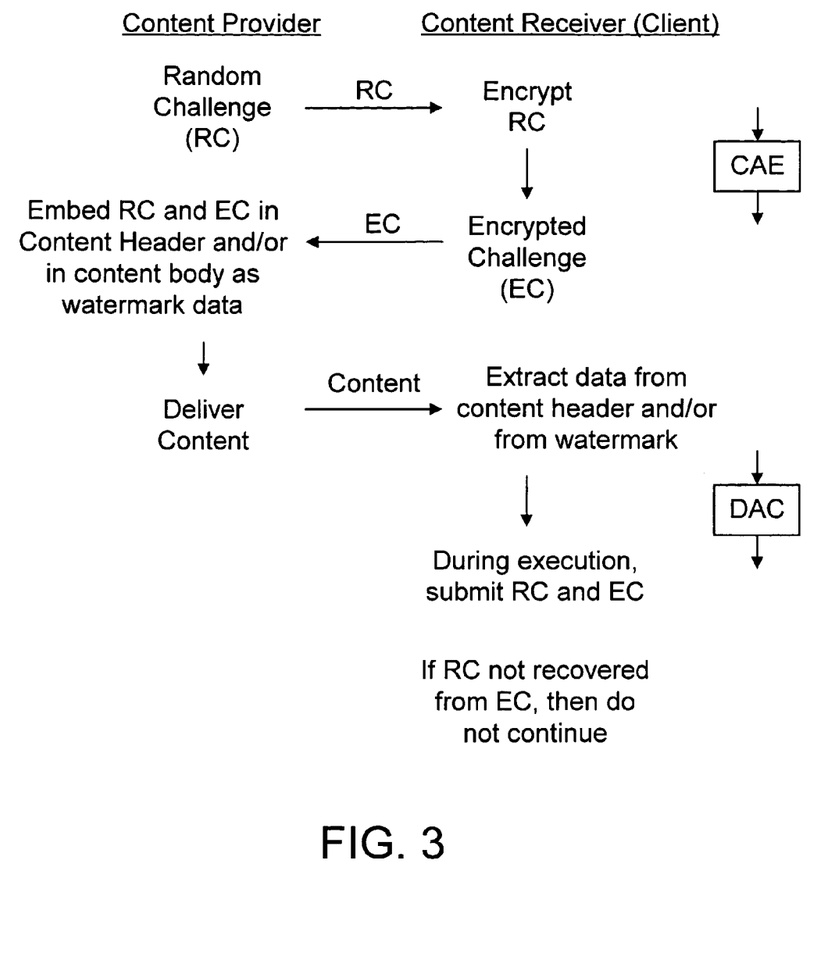
FIG. 3 is a flow diagram illustrating interaction between a remote content provider and content receiver (client) to create a watermark derived with a platform specific value.

In some implementations of using PSN alternatives for digital watermarking schemes, the different parts used for piracy control in the Ellison-variant can be embedded as imperceptible but robust digital watermarks into a piece of content by a remote content provider to a content receiver. As an example, a authentication process is illustrated in FIG. 3. Referring to FIG. 3, a content provider provides a random challenge (RC) to a client (perspective content receiver). The client uses function the RC to create an encrypted challenge (EC). This is called challenge and encrypt (CAE). The EC is returned to the content provider. (RC may also be provided back, but that is not required.) The content provider embeds RC and EC in a content header and/or in content body as watermark data. The content (including the watermark) is provided to the client. The RC and EC are extracted by the client in a decrypt and compare function (DAC). The RC recovered from the EC is compared with a previous RC to determine whether to continue with the content. Also, the EC could be compared with the previous EC. Note that the process of FIG. 3 is not restricted to use in connection with content providing. Rather, it can be used for various authentication processes that do not necessarily involve providing content.

On the content provider side, the "embed RC and EC in Content" takes on the extra meaning of embedding or inserting imperceptible digital watermarks into the source content (e.g., all over the content, in image, audio or video or other data; e.g., inseparable from the source data), in addition or in lieu of, the typical means of embedding the data into content headers (dedicated strings of description text) or separate files attached to the piece of content. The content is not restricted to a particular type of content or format. The content may include video, audio, and/or images (called media content). The content may be non-media content alone or non-media content in combination with media content. Examples of non-media content are text and numbers. The content may include media content and/or non-media content embedded in video, audio, and/or images to be extracted there from. The content is composed of data which may be contiguously or non-contiguously stored.

On the content receiver, the data may be extracted from the header strings or from the separate files attached to the content. In watermarked content, the data (RC, RN, Customized ID or EC, and other user data if desired) can be extracted from the content itself—the source data, like the image pixel values, audio signal values, or the video frames. The extracted data may then be used in authentication (e.g., piracy control) process as in FIG. 3.

Note that a key for inserting the watermark data and extracting the watermark data from the source content is used. We shall use the term watermark key (WK) to distinguish it from the encryption keys. WK is assumed to have been communicated between content provider and content receiver prior to extraction. Or a known (preferably standardized) watermark detector is implemented at the content receiver for extraction of the embedded watermark.

Advantages include the following:

1. Robust data communication: the RC, EC, RN, and copy control data, etc. can be communicated robustly via the source content data. Such data is preserved for subsequent piracy protection even in the face of common format conversations and signal operations which may distort the content data—like lossy compression (e.g., MP3, JPEG, MPEG, etc.), Digital-Analog (D/A, A/D) conversions, and noises in the data. The communication via header information is often unreliable as many conversion programs may strip header information, and the header might not be recoverable after D/A and A/D conversions. The benefit is by virtue of robust watermarking and here we assume the watermarking techniques selected are sufficiently robust to survive these forms of content distortions.

2. Privacy protection by virtue of using PSN alternatives.

Potential deficiencies include the following:

1. Any keys for extracting or decoding the watermark are communicated (presumably through a secure channel).

2. Alternatively, all the content providers will use a pre-defined key WK or a standard set of algorithms to decode the watermark for each receiver. This is less secure especially in the case of using a set of standard algorithms in which security relies on the secrecy of the algorithms. Also, it can suffer from privacy issues in the case where a pre-defined universal key is needed in each receiver, making it a possibility that the content providers can correlate the receiver's watermarking keys as they will need and possibly store the key for watermark embedding.

A practical implementation of the above is as follows: a subset of the data (RC, RN, or EC/Customized ID), say RC or RN, can be used as the base from which the watermark key WK can be derived. The rest of the data, say EC/Customized ID and possibly other user data, can be embedded into the content using WK. This will involve the RC or RN being embedded in a header, for example, or communicated to the receiver in other ways, to enable the subsequent watermark extraction of EC/Customized ID and other user data, from the content.

E. Embodiments Using Multiple Levels of Indirection

In some embodiments of the invention, multiple levels of indirection are used in the authentication process. The multiple levels of indirection can potentially overcome the lower security or less resilient watermark detectors like a set of standardized algorithms, or a low complexity detector, or a detector using a universal (prior agreed upon) key. It should be noted that the scheme can be implemented with one watermark detection algorithm (but with different key inputs), or multiple watermark detection algorithms.

Figure 4:
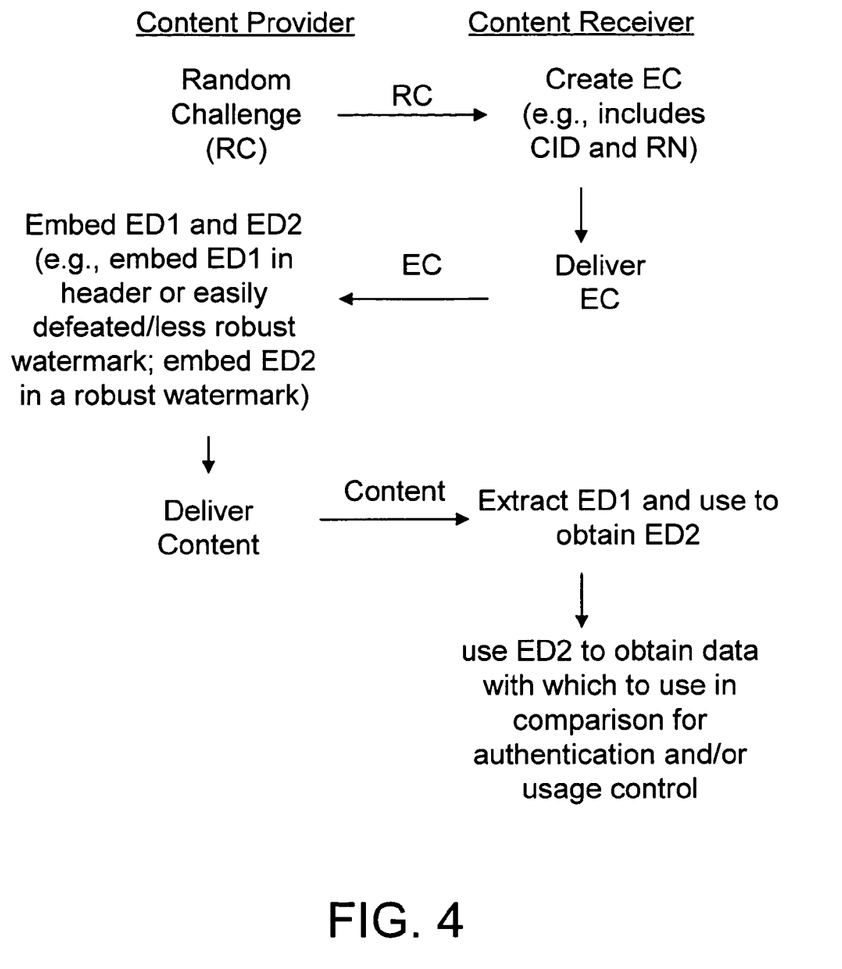
FIG. 4 is a flow diagram showing PSN alternatives with multiple levels indirection according to some embodiments of the invention.

An example is provided in FIG. 4, which is similar to FIG. 3.

Part (i) As in FIG. 3, the content provider in FIG. 4 sends out RC to content receiver computer system (e.g., client player). As noted in connection with FIG. 3, the process of FIG. 4 is not restricted to content providing but can be used for other authentication.

Part (ii) As in FIG. 3, the content receiver in FIG. 4 encrypts the RC and sends EC to the content provider. As an example, EC may include RN and CID.

Part (iii) The content provider partitions data received from the user (data to be embedded into the content, whether in source data as watermark data or in header or attached files) into 2 sets: ED1 (a first set of data to be embedded) and ED2 (a second set of data to be embedded). ED1 and ED2 may be partitioned in various ways. For example, under one scheme ED1 is CID and RN, and ED2 is RC plus, perhaps, any user or provider data, including other copy control data. Under another scheme, ED1 is RC and RN. ED2 is CID plus, perhaps, any user or provider data, including other copy control data. Other partitions may be used.

(a) ED1 may be embedded with methods that potentially pose lower security levels. For example, ED1 may be inserted in header file of the content or embedded by watermarking schemes in which watermarks that can be decoded or extracted using standardized methods (hardware decoder, for example, without watermark key input), or using pre-communicated watermark keys.

(b) ED2 may be embedded as robust watermarks using one (or multiple) watermark key(s) WK.

In some embodiments, the set partitioning is done such that the watermark key(s) WK that was used to embed ED2 as watermarks could be readily derived from ED1—and the derivation of valid watermark key would be secure and only possible with the platform key PK. WK could be derived from ED1 as described by utilizing either the ENC or the DEC instructions—in part (iv) (b), below.

Content provider then delivers the content to the content receiver (client).

Part (iv) Content receiver receives the content.
  (a) The embedded ED1 data is extracted first using a corresponding extraction method as in (iii) (a).
  (b) The watermark key WK is extracted from the embedded ED1 data.
  (c) The watermark key WK is then used to extract the embedded ED2 data.

Part (v) The ED2 data is then used for authentication (e.g., piracy control) during execution, utilizing the decrypt and compare function. RC, RN and CID may be submitted as inputs to a decrypt and compare function, and a match or mismatch bit is recovered that determines whether there is continued content delivery or other action.

Alternatively, the ED2 data can be used for piracy control without going through the full cycle of the decrypt and compare function. The ED2 extracted in part (iv)(c) can be by itself used for piracy control.

Figure 5:
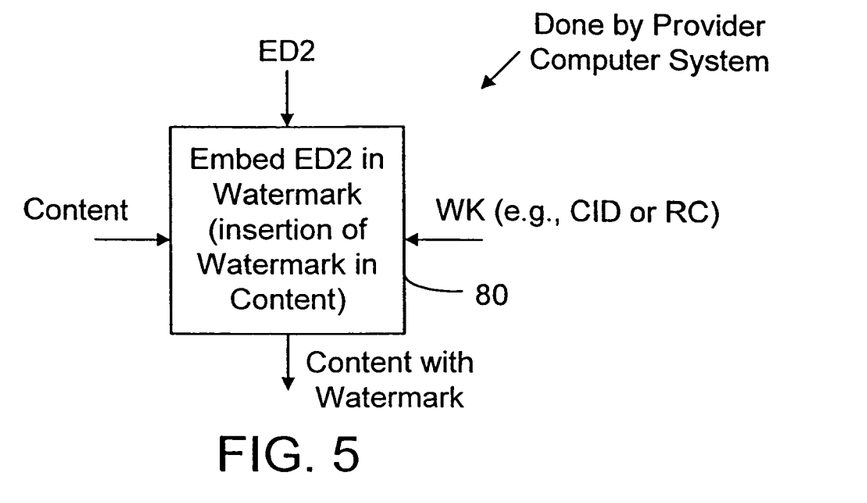
FIG. 5 is a block diagram representation of inserting a set of data (ED2) in a watermark in the content provider's computer system.

FIG. 5 illustrates embedding ED2 in content through a block 80 in the provider computer system, as a function of WK (watermark key). As an example, WK may be CID or RC or some other value. Examples of ED2 are provided below. Block 80 represents hardware and/or software in combination with hardware.

Figure 6:
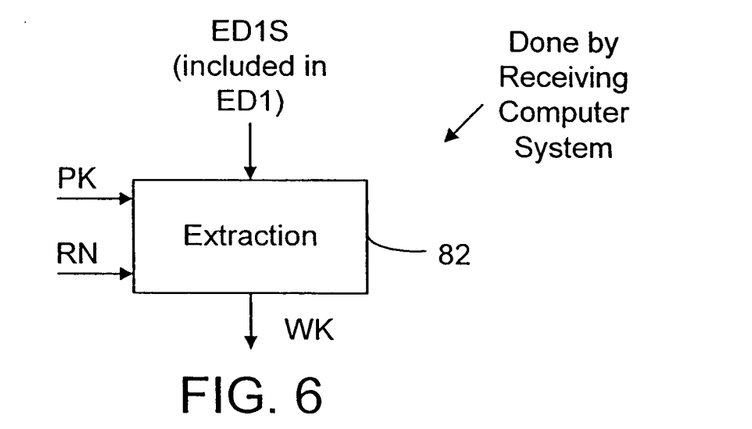
FIG. 6 is a block diagram representation of extraction of a watermark key (WK) in a content receiver computer system.

FIG. 6 illustrates extracting WK from a subset of ED1 (referred to as ED1S) through a block 82 in the content receiver computer system, as a function of, for example, PK (platform key) and RN (random number). As an example, ED1S may be CID or RC. In some embodiments, WK is RC and ED1S is CID. In other embodiments, WK is CID and ED1S is RC. Block 82 represents hardware and/or software in combination with hardware.

Figure 7:
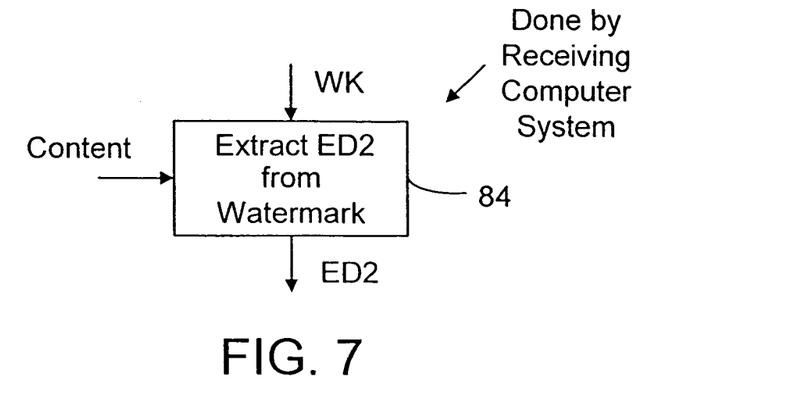
FIG. 7 is a block diagram representation of extraction of a set of data (ED2) in a content receiver computer system.

FIG. 7 illustrates extracting ED2 from the watermark in the content through a block 84 in the content receiver computer system, as a function of WK, obtained from block 82. Block 84 represents hardware and/or software in combination with hardware. A value from ED2 may be used in comparison. For example, RC or CID may be included in ED2 and be compared with another RC or CID. A DAC instruction can be used as in the part (v). Other embedded data (provider, user or control data) can also be extracted. Extracted control data can be used to control the usage of content.

Note that the invention is not limited to the details of FIGS. 4–7.

As an example, one level of indirection is partitioning data sets and a second level is using a first data set to get a second data set. More than two levels may be used.

F. Other Information and Embodiments

The processor and/or other chips can be designed to respond to instruction (e.g., CAE and DAC to name only two) that perform the various functions described herein. Alternatively, the functions can be performed using several or many more conventional instructions. Examples of special instructions include CAE (Challenge and Encrypt) and DAC (Decrypt and Compare) mentioned above. Other potential instructions include ENC (encrypt) and DEC (decrypt) and Platform Encrypt (PENC) and Platform Decrypt (PDEC). As an example, WK could be derived from ED1 as described by utilizing either the ENC or the DEC instructions.

Figure 8:
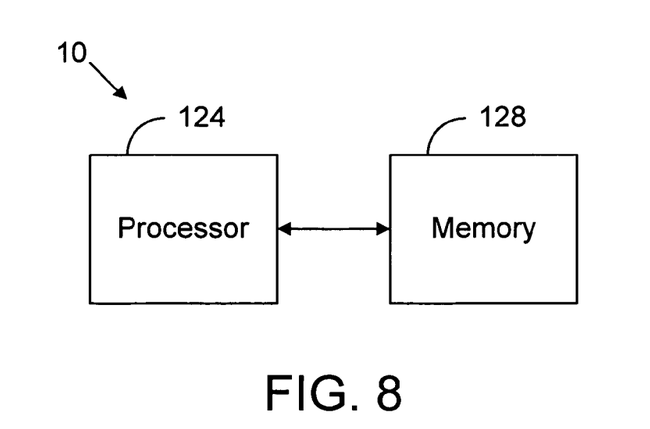
FIG. 8 is a block diagram representation of some components of a computer system that can perform functions according to some embodiments of the invention.

FIG. 8 illustrates some components of computer system 10, including a processor 124 and memory 128. Memory 128 represents one or more of a variety of types of memory apparatus including RAM, hard drives, CD ROMS, and video memory to name only a few. Memory 128 includes storage media on which instructions can be stored to perform the various functions described above. Memory 128 can also store data (e.g., digital video signals) to be processed and intermediate and final results of processing. It will be appreciated that FIG. 8 is highly schematic and in practice would include a variety of other well known components.

Figure 9:
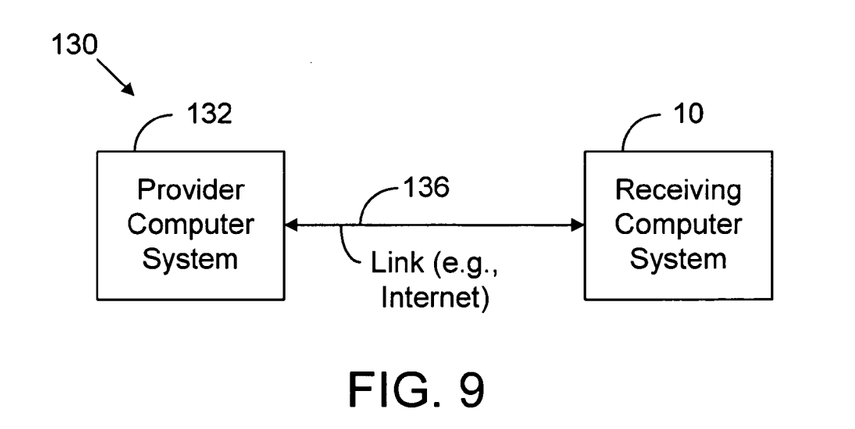
FIG. 9 is a block diagram representation of remote content provider and content receiver computer systems joined through a link (e.g., the Internet).

FIG. 9 illustrates a network 130 including a remote content provider computer system 132, the user computer system 10, and a link 136, which may include one or more of the following: the Internet, an Intranet, local area network (LAN), and wide area network (WAN).

Note that the term "content receiver" is intended to be interpreted broadly to include various types of computers including dedicated hardware. Examples of content receivers include personal computers, portable computers, set-top boxes, to name only some. The content receiver does not have to be a general purpose computer.

In some embodiments, ED1 (embedded in header or detectable by standard low complexity watermark detection with possibly less resilience against attacks) may be used for extraction of the watermark key WK. This is the first level of indirection, made possible by the use of our hardware functionality and instructions provided. Upon extraction of WK, other embedded data in the content can be extracted. The embedded data can give subsequent levels of indirection—a new key can be extracted from the embedded data in different parts of the content, in other words, one key can be used to extract another key which is the key to extract the subsequent one, and so on. This way multiple levels of indirection can be built. The watermarks can be made to vary in different parts of the content. If the provider can issue multiple challenges in the authentication process, the multiple RC values can be used as keys to encode different watermarks in different content segments—and subsequently the levels of indirection can be built the same way as the first level utilizing PSN alternatives and the added ENC or DEC instructions.

One benefit of such a scheme is that the watermark (or a fingerprint) can only be properly extracted at the specific receiver (designated to receive the content). The data is not extractable in other potential receivers. The multiple levels of indirection can potentially overcome the lower security or less resilient watermark detectors like a set of standardized algorithms, or a low complexity detector, or a detector using a universal (prior agreed upon) key. It should be noted that the scheme can be implemented with one watermark detection algorithm (but with different key inputs), or multiple watermark detection algorithms—one for extracting ED1, another for ED2, and the like. The privacy protection is inherent by virtue of utilizing the PSN alternatives with the watermarking process.

Keys may be symmetric or non-symmetric.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method comprising:
   receiving remotely originating data (ROD);
   creating a customized identification (CID) which is at least partially created through encrypting the ROD as a function of a platform key (PK) and a random number (RN) of a computer system receiving the ROD;
   receiving content including at least one watermark in which at least part of the CID is embedded, wherein the content includes first and second data sets, the first data set includes the CID and RN and is used to create a watermark key (WK), and the second data set includes the ROD and is extracted utilizing the WK; and
   creating authentication comparison data (ACD) which is at least partially created through decrypting data embedded in the watermark.

2. The method of claim 1, wherein the ACD is created through decrypting CID in the content as a function of the PK and RN, and the ACD is compared with the ROD and the content is allowed to be played or not depending on an outcome of the comparison.

3. The method of claim 1, wherein the ACD includes at least part of the second data set.

4. The method of claim 1, wherein the second data set further includes copy control data.

5. A method comprising:
   receiving remotely originating data (ROD);
   creating a customized identification (CID) which is at least partially created through encrypting the ROD as a function of a platform key (PK) and a random number (RN) of a computer system receiving the ROD;
   receiving content including at least one watermark in which at least part of the CID is embedded, wherein the content includes first and second data sets, the first data set includes the ROD and RN and is used to create a watermark key (WK), and the second data set includes the CID and is extracted utilizing the WK; and
   creating authentication comparison data (ACD) which is at least partially created through decrypting data embedded in the watermark.

6. The method of claim 5, wherein the second data set further includes copy control data.

7. An apparatus comprising:
   storage media including instructions stored thereon which when executed cause a computer system to perform a method including:
   receiving remotely originating data (ROD);
   creating a customized identification (CID) which is at least partially created through encrypting the ROD as a function of a platform key (PK) and a random number (RN) of a computer system receiving the ROD;
   receiving content including at least one watermark in which at least part of the CID is embedded, wherein the content includes first and second data sets, the first data set, including the CID and RN, is used to create a watermark key (WK) and the second data set, including the ROD, is extracted utilizing the WK; and
   creating authentication comparison data (ACD) which is at least partially created through decrypting data embedded in the watermark.

8. The apparatus of claim 7, wherein the ACD is created through decrypting CID in the content as a function of the PK and RN, and the ACD is compared with the ROD and the content is allowed to be played or not depending on an outcome of the comparison.

9. The apparatus of claim 8, wherein the ACD includes at least part of the second data set.

10. The apparatus method of claim 7, wherein the second data set further includes copy protection data.

11. An apparatus comprising:
    storage media including instructions stored thereon which when executed cause a computer system to perform a method including:
    receiving remotely originating data (ROD);
    creating a customized identification (CD) which is at least partially created through encrypting the ROD as a function of a platform key (PK) and a random number (RN) of a computer system receiving the ROD;
    receiving content including at least one watermark in which at least part of the CID is embedded, wherein the content includes first and second data sets, the first data set includes the ROD and RN and is used to create a watermark key (WK), and the second data set includes the CID and is extracted utilizing the WK.

12. The apparatus method of claim 11, wherein the second data set further includes user data.

13. A method comprising:
    providing data (ROD) to be sent to a remote computer system;
    receiving a customized identification (CID) which is a function of the ROD and a platform key (PK) and a random number (RN) of a remote computer system;
    providing content including at least one watermark in which at least part of the CID is embedded to be sent to a remote computer system, wherein the content includes first and second data sets, the first data set includes the CD and RN and is used to create a watermark key (WK), and the second data set includes the ROD and may be extracted utilizing the WK.

14. The method of claim 13, wherein the second data set may be extracted utilizing the WK and authentication comparison data (ACD), which is at least partially created through decrypting data embedded in the watermark.

15. The method of claim 13, wherein the second data set further includes user data.

16. A method comprising:
    providing data (ROD) to be sent to a remote computer system;
    receiving a customized identification (CID) which is a function of the ROD and a platform key (PK) and a random number (RN) of a remote computer system;
    providing content including at least one watermark in which at least part of the CID is embedded to be sent to a remote computer system, wherein the content includes first and second data sets, the first data set includes the ROD and RN and is used to create a watermark key (WK), and the second data set includes the CID and may be extracted utilizing the WK.

17. The method of claim 16, wherein the second data set further includes user data.

18. An apparatus comprising:
storage media including instructions stored thereon which when executed cause a computer system to perform a method including:
providing data (ROD) to be sent to a remote computer system;
receiving a customized identification (CID) which is a function of the ROD and a platform key (PK) and a random number (RN) of a remote computer system;
providing content to be sent to a remote computer system, the content including first and second data sets, the first data set, including the CID and the RN, is used to create a watermark key (WK), and the second data set, including the ROD, may be extracted utilizing at least the WK.

19. The apparatus of claim 18, wherein the second data set may be extracted utilizing the WK and authentication comparison data (ACD), the ACD is at least partially created through decrypting data embedded in the WK.

20. The apparatus of claim 19, wherein the second data set further includes user data.

21. An apparatus comprising:
storage media including instructions stored thereon which when executed cause a computer system to perform a method including:
providing data (ROD) to be sent to a remote computer system;
receiving a customized identification (CID) which is a function of the ROD and a platform key (PK) and a random number (RN) of a remote computer system;
providing content to be sent to a remote computer system, the content including the first data set, including the ROD and RN, is used to create a watermark key (WK), and the second data set, including the CID, may be extracted utilizing at least the WK.

22. The apparatus of claim 21, wherein the second data set further includes user data.

* * * * *

UNITED STATES PATENT AND TRADEMARK OFFICE
CERTIFICATE OF CORRECTION

| | | |
|---|---|---|
| PATENT NO. | : 7,111,167 B1 | Page 1 of 1 |
| APPLICATION NO. | : 09/608982 | |
| DATED | : September 19, 2006 | |
| INVENTOR(S) | : Yeung et al. | |

It is certified that error appears in the above-identified patent and that said Letters Patent is hereby corrected as shown below:

In column 10, at line 26, delete "(CD)" and insert --(CID)--.
In column 10, at line 48, delete "CD" and insert --CID--.

Signed and Sealed this

Sixth Day of November, 2007

JON W. DUDAS
*Director of the United States Patent and Trademark Office*